UNITED STATES PATENT OFFICE.

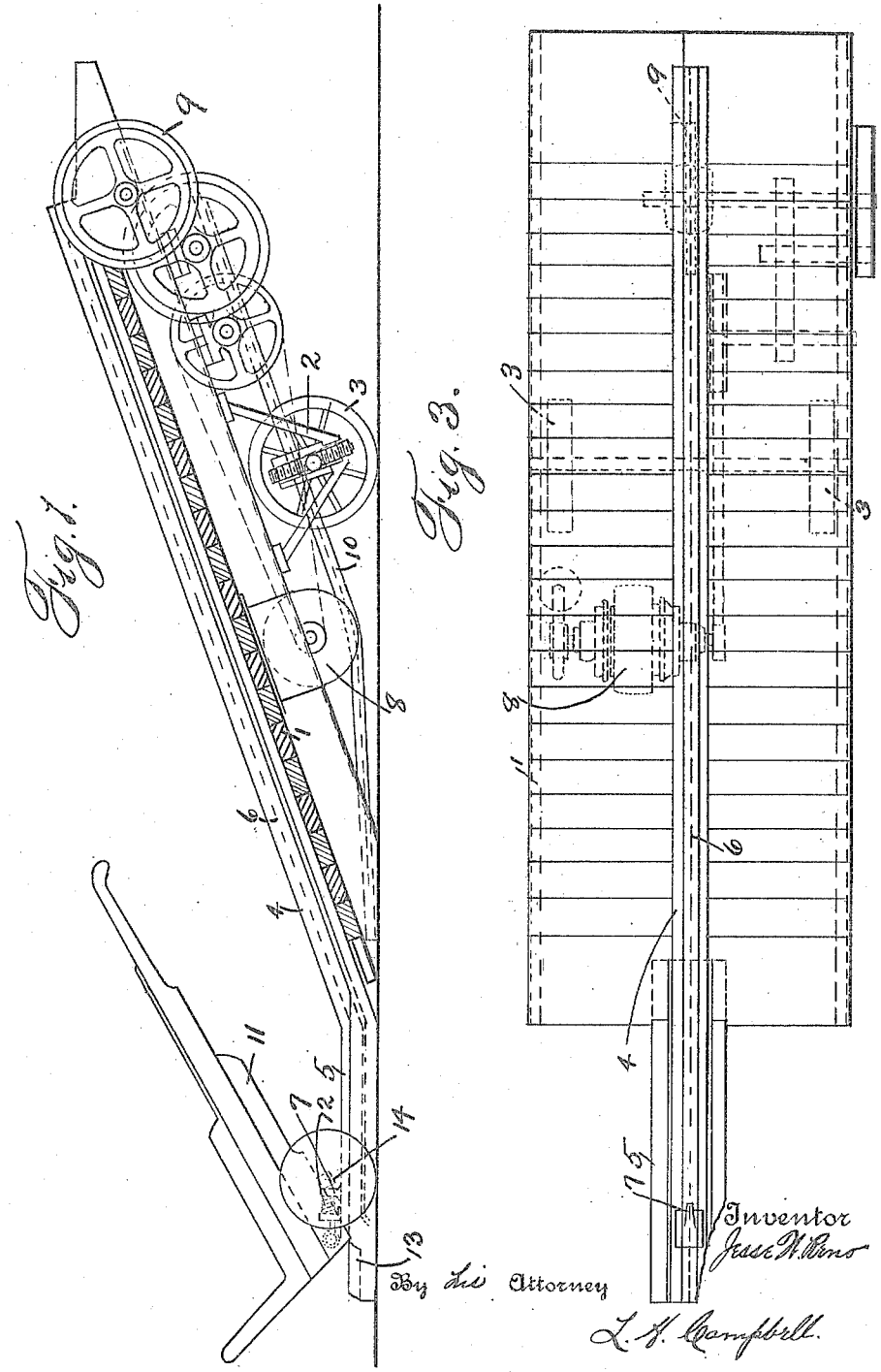

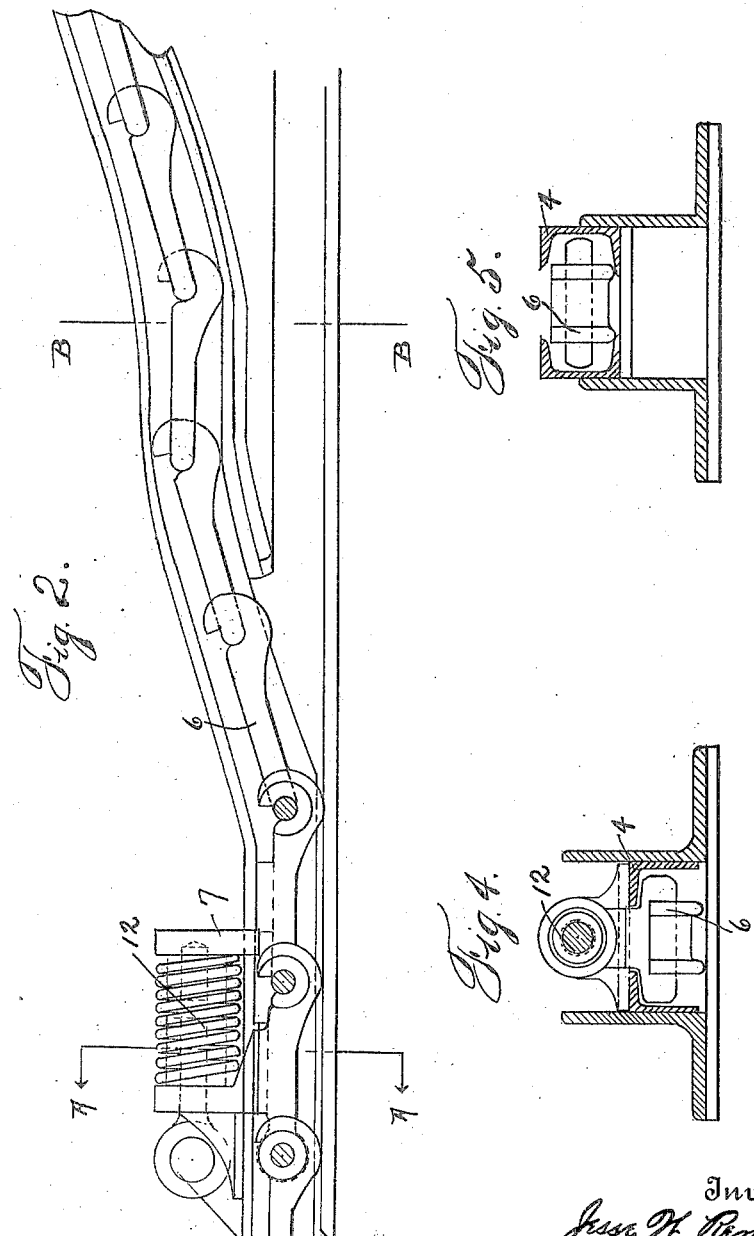

JESSE W. RENO, OF NEW YORK, N. Y., ASSIGNOR TO OTIS ELEVATOR COMPANY, OF JERSEY CITY, NEW JERSEY, A CORPORATION OF NEW JERSEY.

FREIGHT-CONVEYER.

1,291,145.      Specification of Letters Patent.      Patented Jan. 14, 1919.

Application filed August 21, 1917. Serial No. 187,332.

*To all whom it may concern:*

Be it known that I, JESSE W. RENO, a citizen of the United States, residing in New York, in the county of New York and State of New York, have invented a new and useful Improvement in Freight-Conveyers, of which the following is a specification.

My invention relates to an improvement in inclined truck elevators and is particularly adapted for use in connection with truck elevators such as disclosed in my Patent No. 942,352, December 7, 1909. Elevators of the type shown in the said patent are used in warehouses for handling freight and it is necessary in order that a truck may be placed on the elevator that the lower end of the elevator be placed in pits cut in the floor, or that a ramp be used, which necessitates an additional man to help the truck operator to pull the truck up the ramp and on to the elevator. Inasmuch as the freight in the warehouse may be piled at various places about the floor of the warehouse, it has been found that providing pits in the floor of the warehouse is not a very practical arrangement.

The present invention comprises an inclined portable freight elevator complete in itself and it may be moved from one point to another about the floor of the warehouse at will. It comprises a chain carrying a lug at one end, which chain is adapted to travel in guideways provided on an inclined member or ramp, which ramp is supported on wheels which rest on the floor of the warehouse, and so placed with respect to the ramp that, with the apparatus in position for use, one end is on the floor and the other end will abut the floor elevation to which the trucks are to be elevated. The chain carrying the lug is adapted to be driven in either direction by an electric motor carried by the elevator. In operation the truck is wheeled into position to straddle the chain, the electric motor is started up, the lug on the chain will engage the axle of the truck and pull the latter up the incline of the elevator until it gets to its upper end. After the truck has ridden off the elevator, the electric motor may be reversed and the chain carrying its lug be pushed in the opposite direction until the end of the chain rests on the floor, the motor then may be stopped and the apparatus is in position to take hold of another truck, when the same operation will be repeated. By reason of the fact that my present apparatus is portable it can be moved to any desired location in the building, thus eliminating the necessity of having pits sunk in the floor of the warehouse; one man is sufficient to operate the truck, whereas with the old system where ramps have been used two men have been required.

In the accompanying drawings, Figure 1 is an elevational view of my apparatus showing the chain in position to pick up the truck; Fig. 2 is a view showing a portion only of the incline with the chain in full line; Fig. 3 is a plan view showing the relative arrangement of the chain and the driving mechanism therefor; Fig. 4 is a section on the line A A of Fig. 2 looking in the direction of the arrows; Fig. 5 is a section on the line B B of Fig. 2 showing the method of guiding the chain.

Like characters of reference designate like parts throughout the drawing.

The elevator comprises a ramp 1, of wood wide enough to allow sufficient room for a man to walk, a hanger 2, carried by this ramp on its underside carries wheels 3, forming a support for the elevator. On the upper side of the ramp 1, is a guide 4 extending longitudinally of the ramp throughout its entire length and on to an extension 5 at the lower end of the ramp (see Figs. 1 and 3). A chain 6 carrying a lug 7 on one end is adapted to be moved in both directions in the guide 4 by an electric motor 8 carried on the underside of the ramp 1, this motor being suitably geared to the sprocket 9, also carried by the ramp. The chain 6 passes over this sprocket. A guide 10 on the underside of the ramp is provided for the purpose of guiding the end of the chain 6. The guide 4 at its lower end, as viewed in Fig. 1, is shaped so that when the chain 6 carrying the lug 7 is in its initial position the truck 11 may be wheeled on to the portion 5 of the ramp 1 without engaging the lug 7. If desired a shock absorber 12 may be provided in connection with the lug 7 to relieve the sudden strain on the chain 6, when the latter picks up its load.

In operation, the elevator is wheeled into position and left with its portion 5 resting on the floor; the motor 8 is rotated to move the chain 6 in a position where the lug 7 will be at the portion 13 of the guide; truck 11 may now be moved in a position to straddle the chain 6, but by reason of the depressed portion 13 of the guide 4, the lug 7 will not at this time engage the axle 14 of the truck. If the motor is rotated, the chain 6 moves upwardly in the guide 4, carrying the lug 7, into engagement with axle 14 of the truck 11 and moves the truck upwardly to the upper end of the ramp 1; the shock incident to the chain picking up its load will be taken up by the shock absorber 12. In the operation of this device, it will be understood, the man operating the truck walks up the ramp or incline 1 as the truck is carried upwardly by the chain 6. After the truck has been carried to the upper end of the ramp, the electric motor 8 may be reversed to move the chain 6 back again into position to pick up the next truck that is brought along.

It will be seen from the foregoing description that I have provided an inclined elevator, the end of which may rest on the floor of the warehouse and still be adapted to receive a truck, instead of, as in elevators of the type shown in my Patent No. 942,352, December 7, 1909, having to cut a pit in the floor of the warehouse to enable the truck to be picked up by the elevator. Also it will be seen that inasmuch as the end of the elevator resting on the floor is in a horizontal position and straddled by the wheels of the truck, it is no longer necessary to have the services of an extra man to help the operator of the truck pull or push the truck up an incline until it may be picked up by an elevator of the type shown in my patent hereinbefore mentioned; consequently a saving in time and labor is effected, and by reason of the fact that the present apparatus is portable it may be moved about from place to place as desired.

I do not desire to be limited to the precise details of construction and arrangement of parts herein shown and described as others skilled in this art might make various changes therein without departing from the spirit and scope of my invention.

What I claim and desire to secure by Letters Patent of the United States is:—

1. In a portable inclined elevator for hand trucks, the combination of an inclined member, a horizontal member attached thereto and adapted to receive the axle of a truck over it, a chain adapted to engage the said axle, means carried by said inclined member for moving said chain longitudinally of said inclined and horizontal members in either direction.

2. In combination, an inclined member, a horizontal member secured thereto, guides on said horizontal and inclined members, a chain therein and means carried by said inclined members for moving said chain in said guides in either direction.

3. In combination, an inclined member, a horizontal member, guides carried by said horizontal and inclined members, the end of the guide at the end of the horizontal member being depressed, a chain, and means for moving said chain in said guides in either direction.

4. In combination, an inclined member, a horizontal member attached thereto, guides carried by said horizontal and inclined members, a chain adapted to be moved in either direction in said guides, and a lug carried by said chain and adapted to carry a load to the top of the inclined member.

5. In truck conveying apparatus, the combination of an inclined member, a horizontal member attached thereto, guides carried by said horizontal and inclined members, a chain carrying a lug adapted to be moved in either direction in said guides, and a depression at the lower end of said guides into which the end of the chain carrying the lug rests initially.

6. In truck conveying apparatus, the combination of inclined and horizontal members, guides carried thereby, a chain carrying a lug at one end, means for moving said chain in either direction in said guides, and means carried by said chain and coacting with said lug to relieve the strain on the chain when it picks up its load.

7. In truck conveying apparatus, the combination of an inclined member, a horizontal member attached thereto, guides carried by said horizontal and inclined members, a chain, means for pulling the chain upwardly, and for pushing it downwardly, said guides being shaped to prevent buckling of the chain when it is being pushed downwardly.

8. In truck conveying apparatus, the combination of inclined and horizontal members, guiding mechanism carried thereby, a chain in said guiding mechanism, a sprocket at one end of said inclined member about which the chain passes, an electric motor carried by said inclined member and geared to said sprocket to move the said chain in either direction.

9. In truck conveying apparatus, the combination of an inclined member, a horizontal member attached thereto, guiding means carried by said members, a chain adapted for movement in either direction in said guides, actuating means for said chain, a receiving means in addition to the said guiding means for the reception of the end of the chain as the chain is moved upwardly, said receiving means being carried by said inclined member.

10. In truck conveying apparatus, an inclined member, a horizontal member secured thereto, guiding mechanism carried by said members, a length of chain carrying a lug at one end adapted to be moved in either direction, as desired, in said guiding mechanism, a truck engaging lug carried on one end of said chain, a sprocket about which the chain passes, receiving means carried by the inclined member for the reception of the end of the chain opposite to that which carries the lug, and a motor carried by said inclined member for driving said sprocket to move the chain in either direction, as desired.

In testimony whereof, I have signed my name to this specification in the presence of two subscribing witnesses.

JESSE W. RENO.

Witnesses:
ERNEST L. GALE, Jr.,
HAZEL R. GATES.

Copies of this patent may be obtained for five cents each, by addressing the "Commissioner of Patents, Washington, D. C."